April 7, 1959 R. C. IMM 2,881,397

APPARATUS FOR PASSING IMPULSED ELECTRIC SIGNALS

Filed Jan. 5, 1954 2 Sheets-Sheet 1

INVENTOR
RONALD CHARLES IMM

BY Elphis Thimbleton [signature]
ATTORNEY

INVENTOR
RONALD CHARLES IMM
BY
ATTORNEY 2,881,397
Patented Apr. 7, 1959

2,881,397

APPARATUS FOR PASSING IMPULSED ELECTRIC SIGNALS

Ronald Charles Imm, Wembley, England, assignor to The General Electric Company Limited, London, England Application January 5, 1954, Serial No. 402,379
Claims priority, application Great Britain January 7, 1953
3 Claims. (Cl. 333—20)

Figure 1:
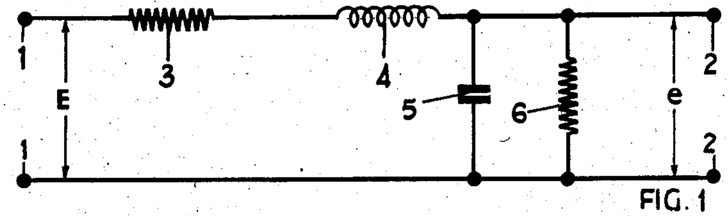

The present invention relates to apparatus for passing electric signals of the type in which the signal consists of a succession of equal time intervals in each of which there may be an electric impulse. Thus if every alternate interval has such a pulse, which is preferably of rectangular waveform although it may be rounded off due to the higher frequency components of such a waveform being attenuated, there will be a period between each pair of adjacent impulses equal in duration to that of an impulse, but it is to be understood that the invention is not in any way restricted to this case.

The signal may, for example, be a pulse code signal, in which case, if impulses occur in several adjacent intervals, the result is effectively a single impulse of longer duration. If a pulse code signal is passed through a passive network, it will be realised that in general the transients introduced by the network are such that the output signal level at the beginning of a time interval is dependent upon the presence or absence of impulses in the immediately preceding intervals. Thus, although the input impulses are all of the same amplitude, the output impulses are not necessarily all of the same amplitude. This condition is undesirable particularly if a voltage slicer is to operate on the pulse code signal passed by the network.

It is one object of the present invention to provide apparatus in which the above difficulty is largely overcome.

If a network through which a pulse code signal of the type specified has a linear characteristic, an impulse in the pulse code signal may be considered as two separate waveforms each containing a single step corresponding to the leading and trailing edges of the impulse respectively. Considering now the step waveform corresponding to the leading edge of the impulse, the network will cause the output waveform to build up to its final level relatively slowly and, by the end of the time interval of the impulse, the level may be somewhat greater than the final steady state level. Accordingly, as a result of this overshoot, there will be a damped oscillatory component in the output before the steady state level is reached. Similarly, upon the occurrence of the step in the other waveform corresponding to the trailing edge of the impulse, there will be similar transient components in the output from the network. Since the network has a linear characteristic, the output waveforms corresponding to the two step waveforms supplied to the network will be the same, although of course inverted, and these two component waveforms are added together to form the output of the network. If the instant at which the leading edge of the impulse occurs is taken as zero time, it can be shown that the optimum condition is for the overshoot at the end of the first time interval to be equal to that at the end of the second interval since then the two component waveforms cancel out at the end of the second time interval, that is to say at the instant one time interval after the cessation of the original impulse.

Thus, according to the present invention, apparatus which has a linear characteristic and which is for passing electric signals of the type specified is arranged to have a transient response such that, upon the application of an input signal having a step in its waveform, for example the leading or trailing edge of an impulse of rectangular waveform, the resulting overshoot in the output waveform after a period equal to one time interval is substantially the same as that after a period equal to two time intervals.

The overshoot at these instants may be very small relative to the steady state level. In other words, upon the occurrence of a step in the applied waveform, the output waveform may just reach a value substantially equal to its steady state level after a period equal to one time interval and have substantially the same value after two time intervals.

Preferably the apparatus is a passive network.

Figure 3:
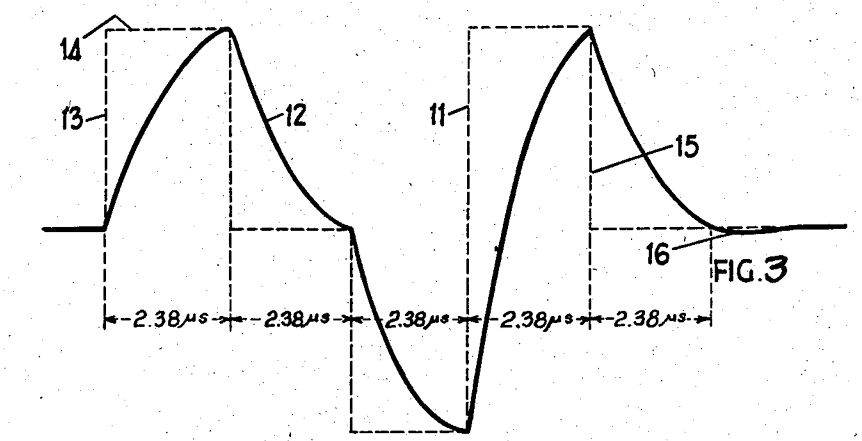
Figure 4:
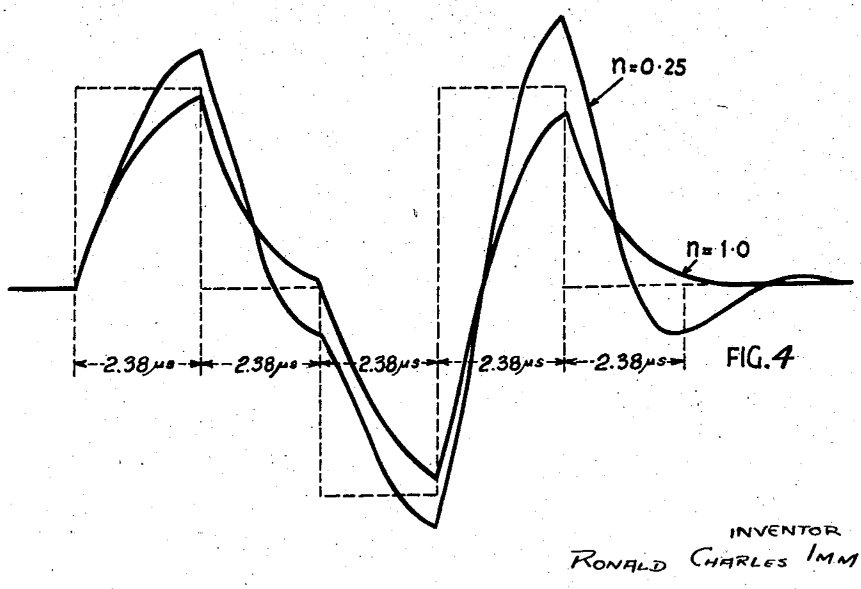
Figure 2:
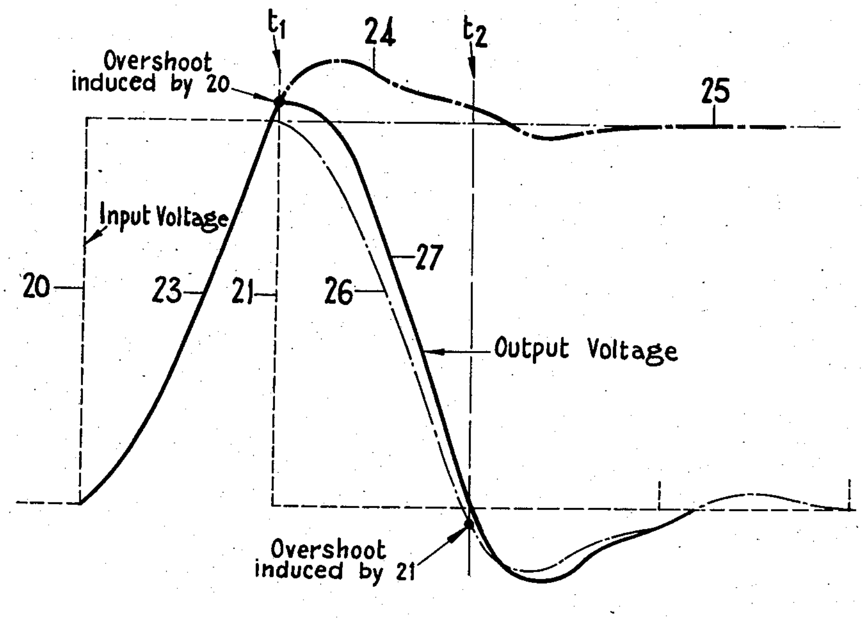

One example of a passive network in accordance with the present invention will now be considered in more detail with reference to Figure 1 of the accompanying drawings which shows the circuit of the network. This network is a low-pass filter designed to pass a pulse code signal that consists of a succession of time intervals each of 2.38 micro-seconds in each of which there may either be a positive-going impulse, no impulse, or a negative-going impulse. The generation of such a pulse code signal is described in the specification of British Patent No. 706,687. Figures 2, 3 and 4 of the accompanying drawings show explanatory waveforms.

Referring now to Figure 1, the network has a pair of input terminals 1 and a pair of output terminals 2, a resistor 3 having a resistance $r$ and a coil 4 having an inductance L being connected in series between one of the input terminals 1 and one of the output terminals 2 while the other input and output terminals are connected together. A condenser 5 having a capacity C and a resistor 6 having a resistance R are connected in parallel across a pair of output terminals 2.

The manner in which the circuit of Figure 1 operates upon the application of a single input pulse to the input terminals 1 will now be considered with reference to Figure 2 of the accompanying drawings. In Figure 2 the input pulse is shown in broken outline with a positive-going wave-front 20 and a negative-going wave-front 21. The positive-going wave-front 20 will first be considered. This wave-front disturbs the balance of electric forces in the network and results in a relatively slow build up of potential at the output terminals 2. In fact at the time marked $t_1$, which is the instant at which the negative-going wave-front 21 occurs and which in the present example is 2.38 microseconds after the occurrence of the positive-going wave-front 20, the output voltage across the terminals 2 is still increasing. In Figure 2 this output voltage is shown by the line 23.

After the instant $t_1$ the output voltage due to the wave-front 20 continues to rise as shown by the dot and dash line 24. This voltage in fact oscillates somewhat and finally levels off at the level 25 which is dependent upon the amplitude of the input pulse.

Considering now the case of the trailing edge negative-going wave-front 21, this too will engender a corresponding change in voltage at the output terminals 2. This output voltage is shown by the dot and dash line 26. At the instant $t_2$, which is 2.38 microseconds after the occurrence of the wave-front 21, the overshoot of the voltage 26 is exactly equal to that of the voltage 23 at the time $t_1$.

After the time $t_1$, the actual output voltage developed between the terminals 2 is, of course, dependent upon the transient voltages caused by both the wave-fronts 20 and 21 of the input pulse. In fact the output voltage is then the sum of these transient voltages and slowly returns to its initial value as shown in Figure 2 by the line 27.

The network is dimensioned in accordance with the present invention so that the overshoot of the output voltage component due to the wave-front 20 at the time $t_2$ has exactly the same overshoot as at the time $t_1$. The effect of this is that at the time $t_2$ the overshoots in the voltages represented by the lines 24 and 26 are equal in amplitude but opposite in sense so that the resultant output voltage has no overshoot at that time.

It will, of course, be understood that the waveforms shown in Figure 2 are somewhat exaggerated for the purpose of illustration.

Looking at the network of Figure 1 another way, if a voltage having an instantaneous value E is applied across the pair of input terminals 1, and the resulting voltage across the output terminals 2 has an instantaneous value $e$, it can be shown that:

$$\frac{e}{E}=\left(\frac{R}{R+r}\right)\left[1-\frac{\exp.-\alpha t}{(1-n)^{1/2}}\cdot\sin\left(\alpha\left(\frac{1}{n}-1\right)^{1/2}\cdot t+\theta\right)\right] \quad (1)$$

where $$\theta=\tan^{-1}\left(\frac{1}{n}-1\right)^{1/2}$$

$$n=\frac{\alpha^2}{\omega_c^2}$$

$$\alpha=\frac{1}{2RC}\cdot\left(1+rR\cdot\frac{C}{L}\right)$$

and $$\omega_c^2=\frac{1+r/R}{LC}$$

As previously discussed, the optimum condition as far as the present considerations are concerned is that, upon the occurrence of a step in the waveform of the input signal, the overshoot of the output signal after an interval of 2.38 micro-seconds should be equal to that after an interval of 4.76 micro-seconds. In practice, the overshoot after 4.76 micro-seconds is very small so that as a first approximation it can be neglected. Accordingly there is to be no overshoot after 2.38 micro-seconds and the network parameters for that condition are given by the first zero of the expression:

$$\sin\left(\alpha\left(\frac{1}{n}-1\right)^{1/2}\cdot t+\theta\right) \quad (2)$$

There are, of course, an infinite number of solutions but the values taken in the present example are:

$\alpha=1.52\times10^6$, and
$n=0.67$

Substituting these values in the Expression 1 it is found that at $t=4.76$ micro-seconds the overshoot is approximately 0.1%. These values of $\alpha$ and $n$ are, as can be seen from inspection of the Expression 1, slightly greater than those necessary for optimum performance of the network by virtue of the approximation mentioned above. In practice, therefore, the resistance R is varied while observing a test waveform on an oscilloscope.

The input voltage E may be supplied by a cathode follower stage and in that case the resistance $r$ may consist of the output impedance of the cathode follower stage together with the losses of the coil 4, the resistor 3 being omitted. The resistance R is, in practice, usually considerably greater than the resistance $r$. If R is about five times the resistance $r$, changes in $r$ have little effect on the transient response of the network.

Taking the parameters $\alpha$ and $n$ as $1.52\times10^6$ and 0.67 respectively, suitable component values for this network are:

$r$=200 ohms
$L$=1 milli-henry
$R$=1,000 ohms, and
$C$=350 micro-microfarads

The response of the network with these component values is shown in Figure 3 of the accompanying drawing. A portion of the waveform of the input signal supplied across the terminals 1 is shown as a broken line 11 and the corresponding waveform of the signal developed across the output terminals 2 is shown by the line 12, the two waveforms being drawn to different scales so that the ordinate representing the steady state output voltage upon the application of say the step 13 in the input waveform is the same as the ordinate representing the level 14 of that step. It will be noted that upon the occurrence of the step 13, for example, in the waveform 11, the waveform 12 just reaches a value that is substantially equal to the level 14 after a period of 2.38 micro-seconds. It will be appreciated that each step in the waveform 11 produces some overshoot in the output waveform after a time greater than 2.38 micro-seconds after the occurrence of the step. The step 15, for example, in the waveform 11 produces an overshoot 16 as shown in the drawing.

Figure 4 shows the effect of selecting values of the parameters $\alpha$ and $n$ equal to $0.79\times10^6$ and 0.25 respectively in one case and $1.98\times10^6$ and 1.0 respectively in the other, networks having these parameters not being within the scope of the present invention.

It will be appreciated that the invention is not restricted to filters but may, for example, be applied to a network which is required to effect equalization of a pulse code signal received over a transmission line.

I claim:

1. Apparatus for passing electric signals of the type in which the signal consists of a succession of equal time intervals in each of which there may be an electric impulse having its leading and trailing edges approximately coincident with the beginning and end respectively of the interval: said apparatus comprising a pair of input terminals, a pair of output terminals, and a low-pass filter connected between the pairs of input and output terminals and having a linear steady state relationship between the voltage across the pair of input terminals and the resultant voltage across the pair of output terminals said filter having transient response such that upon the application across the pair of input terminals of a voltage step the resulting overshoot in the waveform of the voltage across the pair of output terminals after a period equal to one of said time intervals is substantially the same as that after a period equal to two such time intervals.

2. Apparatus according to claim 1 wherein the said low-pass filter consists of passive components.

3. An electric arrangement comprising means to supply an electric signal consisting of a succession of equal time intervals in each of which there may be an electric voltage impulse having its leading and trailing edges approximately coincident with the beginning and end respectively of the interval, a low-pass filter having a pair of input terminals and a pair of output terminals, and a connection between the said means and the input terminals of the filter for applying the said signal across the input terminals, the said filter having a linear steady state relationship between the voltage across the pair of input terminals and the resultant voltage across the pair of output terminals and a transient response such that when there is a voltage step in the electric signal supplied by the said means the resulting overshoot in the waveform of the voltage across the pair of output terminals after a period equal to one of said time intervals is substantially the same as that after a period equal to two such time intervals.

References Cited in the file of this patent

"Communication Networks," vol. 1, by E. A. Guillemann, pub. by John Wiley & Sons, N. Y., and Chapman & Hall, Ltd., London, 1931, pages 51–68. Page 58 particularly relied on. (Copy in Scientific Library and Div. 69.)